US009201256B2

(12) United States Patent
Huang

(10) Patent No.: US 9,201,256 B2
(45) Date of Patent: Dec. 1, 2015

(54) THREE-DIMENSIONAL DISPLAY AND METHOD FOR MANUFACTURING THE SAME

(71) Applicant: BENQ MATERIALS CORPORATION, Guishan Township (TW)

(72) Inventor: Kuan-Hao Huang, Taoyuan (TW)

(73) Assignee: Benq Materials Corporation, Guishan Township (TW)

( * ) Notice: Subject to any disclaimer, the term of this patent is extended or adjusted under 35 U.S.C. 154(b) by 504 days.

(21) Appl. No.: 13/836,899

(22) Filed: Mar. 15, 2013

(65) Prior Publication Data

US 2013/0329143 A1 Dec. 12, 2013

(30) Foreign Application Priority Data

Jun. 7, 2012 (TW) .............................. 101120430 A

(51) Int. Cl.
*G02F 1/1335* (2006.01)
*G02F 1/1337* (2006.01)
(Continued)

(52) U.S. Cl.
CPC .......... *G02F 1/1333* (2013.01); *G02B 27/2214* (2013.01); *G02B 27/26* (2013.01); *G02F 1/1337* (2013.01); *G02F 1/13363* (2013.01); *G02F 1/133753* (2013.01);
(Continued)

(58) Field of Classification Search
CPC .. G02B 27/26; G02B 27/2214; G02B 5/3083; G02F 1/13363; G02F 1/133634; G02F 1/1337; G02F 1/133711; G02F 1/134363; H04N 13/0404; H04N 13/0434; H04N 13/0409

USPC ............................................ 349/15, 123, 117
See application file for complete search history.

(56) References Cited

U.S. PATENT DOCUMENTS

2006/0126156 A1* 6/2006 Evans ................... G02F 1/1323
359/320

(Continued)

FOREIGN PATENT DOCUMENTS

| JP | 2005049865 A | 2/2005 |
| JP | 2012068541 A | 4/2012 |
| JP | 2012073515 A | 4/2012 |

OTHER PUBLICATIONS

Office Action of corresponding TW application, published on Aug. 12, 2014.

*Primary Examiner* — Mike Qi
(74) *Attorney, Agent, or Firm* — Wang Law Firm, Inc.; Li K. Wang; Stephen Hsu

(57) ABSTRACT

A three-dimensional display and method for manufacturing the same are provided. The three-dimensional display includes a display panel, a liquid crystal layer, an aligning layer and an adhesive layer. The liquid crystal layer is disposed on a side of the display panel. The aligning layer formed from a curable resin is disposed on a side of the liquid crystal layer opposite to the display panel and comprises a plurality of first aligning regions and a plurality of second aligning regions. The adhesive layer is disposed between the display panel and the liquid crystal layer, wherein the display panel and the liquid crystal layer are adhered by the adhesive layer. Wherein the pencil hardness of the aligning layer is in the range of 1B to 4H, and the adhesion of the adhesive layer is in the range of 50 gf/25 mm to 1500 gf/25 mm.

10 Claims, 5 Drawing Sheets

(51) Int. Cl.
*G02F 1/1333* (2006.01)
*G02F 1/13363* (2006.01)
*G02B 27/22* (2006.01)
*G02B 27/26* (2006.01)

(52) U.S. Cl.
CPC .............. *G02F 2001/133631* (2013.01); *G02F 2001/133633* (2013.01); *G02F 2001/133638* (2013.01); *G02F 2202/023* (2013.01)

(56) References Cited

U.S. PATENT DOCUMENTS

2012/0002281 A1\* 1/2012 Inoue .................... G02B 5/0226
 359/486.01
2014/0313581 A1\* 10/2014 Kashima .............. G02B 5/3016
 359/489.07
2015/0205142 A1\* 7/2015 Kim ....................... G02B 27/26
 349/15

\* cited by examiner

THREE-DIMENSIONAL DISPLAY AND METHOD FOR MANUFACTURING THE SAME

CROSS-REFERENCE TO RELATED APPLICATION

This application claims the benefit of Taiwan Patent Application No. 101120430, filed on Jun. 7, 2012, in the Taiwan Intellectual Property Office, the disclosure of which is incorporated herein in its entirety by reference.

BACKGROUND OF THE INVENTION

1. Field of the Invention

The invention relates to a display and a method for manufacturing the same, and more particularly to a three-dimensional display and a method for manufacturing the same.

2. Description of the Related Art

In recent years, three-dimensional display systems with enhanced image quality have been drawing more attention to the industry and become more popular to customers. In view of the appearance, the technology of three-dimensional display can be roughly categorized into two types. One is the stereoscopic type which requires a viewer to wear specially designed glasses, and the other is the auto-stereoscopic type which allows the viewer to watch directly with naked eyes. The stereoscopic type three-dimensional display technology can be realized by using color filter glasses, polarizing glasses, shutter glasses, and so forth. According to the stereoscopic type three-dimensional display technology, a display shows images with different information to the left and the right eyes of the viewer. The different images are viewed by the left and the right eyes of the viewer through the glasses, and the images are combined to form a three-dimensional image.

Based on the stereoscopic type three-dimensional display technology, the display image can be divided into a left-eye visible region and a right-eye visible region by means of a patterned retarder film, a stereo imaging can thus be provided for the audience wearing a pair of polarization glasses.

However, the prior patterned retarder film comprises a substrate for supporting aligning layer and liquid crystal layer thereon. The disposition of the substrate will thicken the thickness of the three-dimensional display. In addition, the phase retardation of the substrate must be 0 to avoid affecting the display quality of the three-dimensional display, using this substrate will increase manufacturing cost of three-dimensional displays.

In view of the foregoing, an object of the present invention is to provide a three-dimensional display that is capable for alleviating the disadvantage of the prior art.

SUMMARY OF THE INVENTION

The present invention is directed to a three-dimensional display and a method for manufacturing the same. The three-dimensional display has thinner thickness and lower manufacturing cost.

According to an aspect of the present invention, a three-dimensional display is provided. In an embodiment of the present invention, the three-dimensional display comprises a display panel, a liquid crystal layer, an aligning layer and an adhesive layer. The liquid crystal layer is disposed on a side of the display panel. The aligning layer is formed from a curable resin and is disposed on a side of the liquid crystal layer opposite to the display panel. The aligning layer comprises a plurality of first aligning regions and a plurality of second aligning regions, wherein the first aligning regions are interleaved with the second aligning regions and parallel to each other, the liquid crystals above the first aligning regions provides a first phase retardation, the liquid crystals above the second aligning regions provides a second phase retardation, and the difference between the first phase retardation and the second phase retardation is $\lambda/2$. The adhesive layer is disposed between the display panel and the liquid crystal layer, and the display panel and the liquid crystal layer are adhered together by the adhesive layer. The pencil hardness of the aligning layer is in the range of 1B to 4H, and the adhesive strength of the adhesive layer is in the range of 50 gf/25 mm to 1500 gf/25 mm.

In an embodiment of the present invention, the curable resin is an UV-curable resin or a thermal-curable resin.

In an embodiment of the present invention, the curable resin is selected from a group consisting of acrylic resin, silicone resin and epoxy resin.

In an embodiment of the present invention, a cohesive strength between the aligning layer and the liquid crystal layer is in the range of 3B to 5B tested by cross hatch test.

In an embodiment of the present invention, the material of adhesive layer is selected from a group consisting of acrylic resin, silicone resin and epoxy resin.

In an embodiment of the present invention, the three-dimensional display further comprises a polarizer which is disposed between the adhesive layer and the display panel.

In an embodiment of the present invention, the three-dimensional display further comprises at least one functional optical film which is disposed on a side of the aligning layer opposite to the liquid crystal layer thereof, wherein the functional optical film is selected from a group consisting of hard-coating film, anti-glaring film, anti-static film, low reflective film, anti-reflective film and a combination thereof.

According to another aspect of the present invention, a method for manufacturing a three-dimensional display is provided.

In an embodiment of the method of the present invention, the method for manufacturing a three-dimensional display comprises the steps of: providing a substrate; coating a curable resin on the substrate; forming an aligning micro-structures on the curable resin; curing the curable resin to form an aligning layer; coating a liquid crystal layer on the aligning layer; aligning the liquid crystal layer with the aligning layer; curing the liquid crystal layer; coating an adhesive layer on the liquid crystal layer; adhering a display panel on the liquid crystal layer by the adhesive layer; and releasing the substrate from the aligning layer. Wherein, the aligning layer comprises a plurality of first aligning regions and a plurality of second aligning regions, the first aligning regions are interleaved with the second aligning regions and parallel to each other, the liquid crystals above the first aligning regions provides a first phase retardation, the liquid crystals above the second aligning regions provides a second phase retardation, and the difference between the first phase retardation and the second phase retardation is $\lambda/2$. The pencil hardness of the aligning layer is in the range of 1B to 4H, and the adhesive strength of the adhesive layer is in the range of 50 gf/25 mm to 1500 gf/25 mm.

In an embodiment of the method of the present invention, the material of the substrate is selected from a group consisting of triacetyl cellulose (TAC), poly (ethylene terephthalate) (PET), polycarbonate (PC), poly (methyl methacrylate) (PMMA) and polypropylene (PP).

In an embodiment of the method of the present invention, the curable resin is an UV curable resin and an accumulated energy for curing the curable resin is in the range of 100 mJ/cm$^2$ to 1000 mJ/cm$^2$.

In summary, the three-dimensional display of the present invention has a thinner thickness because of the lack of the substrate for supporting liquid crystal. In addition, the manufacturing cost of three-dimensional display can be decreased by using a non-zero phase retardation substrate for supporting liquid crystal layer and aligning layer during manufacturing process.

The foregoing presents a simplified summary of the disclosure in order to provide a basic understanding of the present invention. This summary is not an extensive overview of the disclosure and it does not identify key/critical elements of the present invention or delineate the scope of the present invention. Its sole purpose is to present concepts disclosed herein in a simplified form as a prelude to the more detailed description that is presented later.

Many of the attendant features will be more readily appreciated as the same becomes better understood by reference to the following detailed description considered in connection with the accompanying drawings. It is noteworthy that the drawings shown in the figures are for illustrative purposes only and not to scale.

DETAILED DESCRIPTION OF THE PREFERRED EMBODIMENTS

Figure 1:
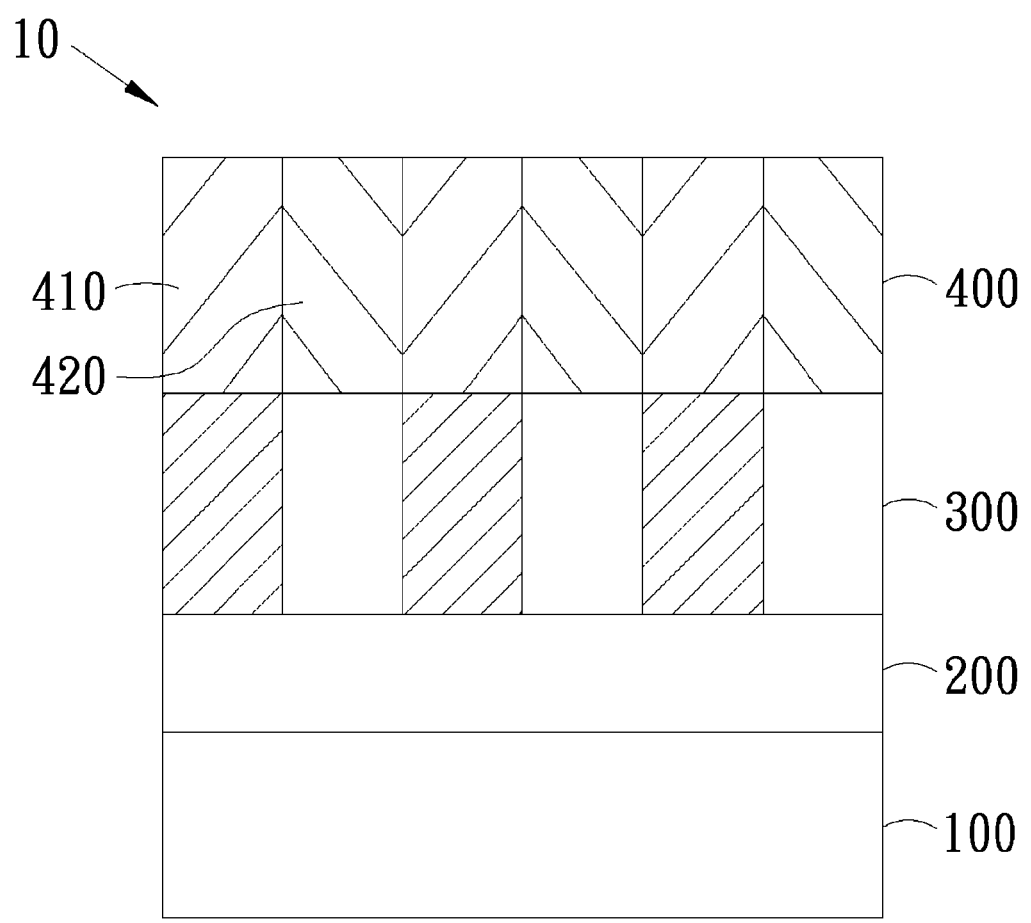
FIG. 1 is a cross-sectional view of a three-dimensional display according to an embodiment of this invention.

Accordingly, a three-dimensional display and a method for manufacturing the same are provided. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an aspect of the present invention, a three-dimensional display is provided.

FIG. 1 is a cross-sectional view of a three-dimensional display 10 according to an embodiment of this invention. The three-dimensional display 10 is used in stereo displaying and has advantages of lower manufacturing cost and thinning overall thickness. The three-dimensional display 10 shown in FIG. 1 comprises a display panel 100, a liquid crystal layer 300 which is disposed on a side of the display panel 100, an aligning layer 400 which is disposed on a side of the liquid crystal layer 300 opposite to the display panel 100 and an adhesive layer 200 which is disposed between the display panel 100 and the liquid crystal layer 300.

The aligning layer 400 shown in FIG. 1 is formed from a curable resin. In an embodiment of the present invention, the curable resin is an UV-curable resin, and the material of the curable resin is selected from a group consisting of acrylic resin, silicone resin and epoxy resin. In another embodiment of the present invention, the curable resin is a thermal-curable resin. The aligning layer 400 comprises a plurality of first aligning regions 410 and a plurality of second aligning regions 420, wherein the first aligning regions 410 are interleaved with the second aligning regions 420 and parallel to each other, the liquid crystals above the first aligning regions 410 provides a first phase retardation, the liquid crystals above the second aligning regions 420 provides a second phase retardation, and the difference between the first phase retardation and the second phase retardation is $\lambda/2$. In an embodiment of the present invention, a cohesive strength between the aligning layer 400 and the liquid crystal layer 300 is in the range of 3B to 5B tested by cross hatch test. The cross hatch test is a well-known method to determine a coating adhesion or strength of the bond between substrate and coating, or between different coating layers or the cohesive strength of some substrates.

The pencil hardness of the aligning layer 400 is in the range of 1B to 4H, and more preferably in the range of 2H to 3H. In an embodiment of the present invention, the aligning layer 400 is formed from a UV-curable resin, such as acrylic resin HC-1433 (available from SAU applied materials Ltd., Taiwan), and the pencil hardness is about H thereof.

In an embodiment of the present invention, the aligning layer 400 is formed by, for example, such as micro-scratch alignment treatment, rubbing treatment, photo-alignment, SiO$_2$ evaporation, or ion beam alignment. In a preferred embodiment of the present invention, the aligning layer 400 is formed when the curable resin is embossed by a grooved roller. The surface of grooved roller has predetermined patterned structures which will be transferred to the curable resin by embossing treatment to form the first aligning regions 410 and the second aligning regions 420 on the aligning layer 400. The method for forming the aligning layer 400 is not limited thereto.

The display panel 100 and the liquid crystal layer 300 are adhered together by the adhesive layer 200. The material of adhesive layer 200 is selected from a group consisting of acrylic resin, silicone resin and epoxy resin. The adhesive strength of the adhesive layer is in the range of 50 gf/25 mm to 1500 gf/25 mm, and more preferably in the range of 100 gf/25 mm to 300 gf/25 mm. In an embodiment of the present invention, the material of adhesive layer 200 is acrylic resin and the adhesive strength is about 200 gf/25 mm thereof.

In an embodiment of the present invention, the three-dimensional display 10 further comprises a polarizer which is disposed between the adhesive layer 200 and the display panel 100.

In an embodiment of the present invention, the three-dimensional display 10 further comprises at least one of functional optical film which is disposed on a side of the aligning layer 400 opposite to the liquid crystal layer 300 thereof selectively. The functional optical film is selected from a group consisting of hard-coating film, anti-glaring film, anti-static film, low reflective film, anti-reflective film and a combination thereof.

According to another aspect of the present invention, a method for manufacturing three-dimensional display 10 is provided. FIGS. 2A to 2F illustrate the steps in a method for manufacturing a three-dimensional display 10 of an embodiment of the present invention.

Firstly, a substrate 900 is provided, as shown in FIG. 3A. The phase retardation of substrate 900 can not be 0. The material of substrate 900 can be, but not limited to poly (ethylene terephthalate) (PET), polycarbonate (PC), triacetyl cellulose (TAC), poly(methyl methacrylate) (PMMA) or cyclo-olefin polymer (COP). In an embodiment of the method of the present invention, the substrate 900 is triacetyl cellulose (TAC).

Figure 2A:
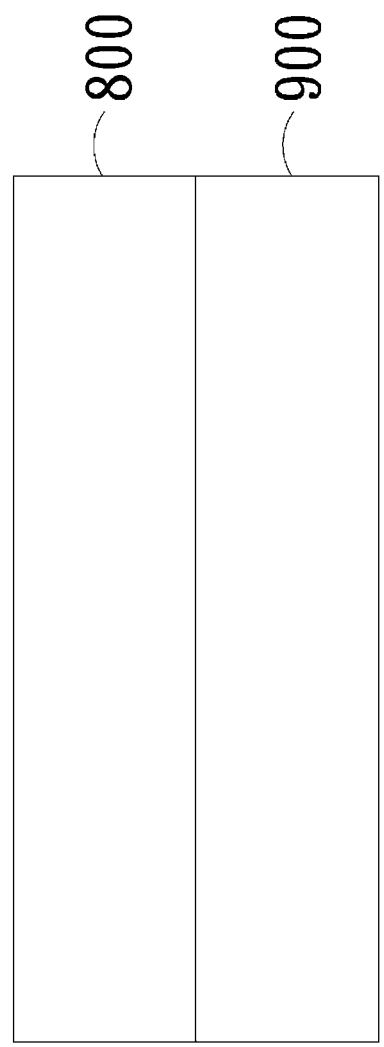
FIGS. 2A to 2F illustrate the steps in a method for manufacturing a three-dimensional display of an embodiment of the present invention.

As shown in FIG. 2A, a curable resin 800 is coated on the substrate 900. In an embodiment of the method of the present invention, the curable resin 800 is a UV curable resin or a thermo-curable resin as the mentioned above. The method of coating the curable resin 800 on the substrate 900 can be, but not limited to slit coating, roller coating or die coating. In an embodiment of the method of the present invention, the curable resin is an UV-curable resin, such as acrylic resin HC-1433 (available from SAU applied materials Ltd., Taiwan).

Figure 2B:
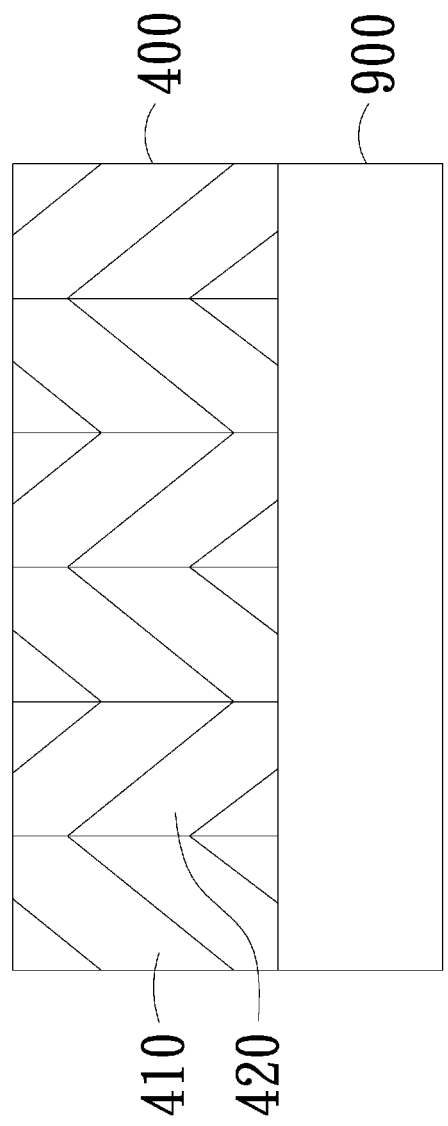

As shown in FIG. 2B, aligning micro-structures are formed on the substrate 900. The aligning micro-structures can be formed by embossing the curable 800 with a predetermined pattern. The embossing treatment is effected by a stamp or a roller having a predetermined pattern on the surface thereof. In a preferred embodiment of the method of the present invention, the embossing treatment is effected by a grooved roller. The surface of the grooved roller is molded with a set of relief structures which are grating stripe structure, and are interlaced and parallel to each other. The structures on the surface of the grooved roller are transferred to the curable resin layer 800 to form the aligning micro-structures. In another embodiment of the method of the present invention, the aligning micro-structures are formed, for example, by micro-scratch alignment treatment, rubbing treatment, photo-alignment, SiO2 evaporation, or ion beam alignment.

After the aligning micro-structures are formed, the aligning micro-structures are cured to form an aligning layer 400. As shown in FIG. 2B, the aligning layer 400 comprises a plurality of first aligning regions 410 and a plurality of second aligning regions 420, wherein the first aligning regions 410 are interleaved with the second aligning regions 420 and parallel to each other. In an embodiment of the method of the present invention, the curable resin 800 is an UV-curable resin, such as acrylic resin HC-1433 (available from SAU applied materials Ltd., Taiwan) and an accumulated energy for curing the curable resin 800 is in the range of 100 mJ/cm$^2$ to 1000 mJ/cm$^2$. Tested by cross hatch test, a cohesive strength between the cured aligning layer 400 and the substrate 900 is in the range of 0B to 2B, and more preferably in the range of 0B to 1B. The pencil hardness of aligning layer is in the range of B to 4H, more preferably in the range of H to 3H. In an embodiment of the method of the present invention, the pencil hardness of aligning layer is H and the cohesive strength between the aligning layer 400 and the substrate 900 is 0B tested by cross hatch test. In an embodiment of the method of the present invention, a functional additive is added to the curable resin 800 selectively, the functional additive is selected from a group consisting of hard-coating agent, anti-glaring agent, anti-static agent, anti-reflective agent and a combination thereof.

Figure 2C:
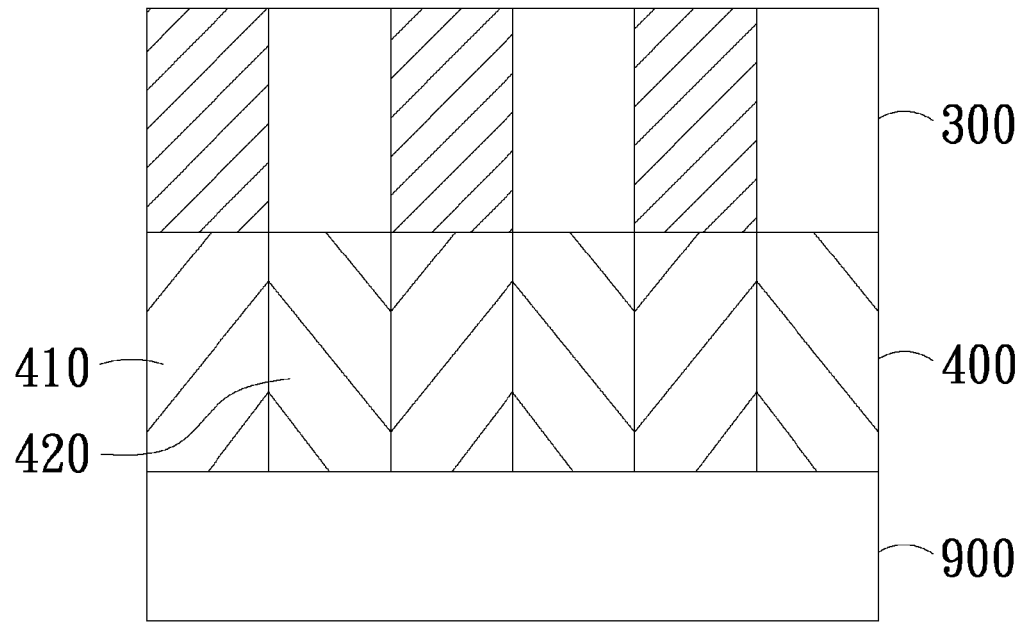

After the aligning layer 400 is formed, a liquid crystal layer 300 is formed on the aligning layer 400 as shown in FIG. 2C. The method for forming the liquid crystal layer 300 is, for example, slit coating or other method which is known to an artisan skilled in the relevant art. In an embodiment of the method of the present invention, the material of liquid crystal layer 300 is rod-like liquid crystals Merck 973 (available from Merck Display Tech Ltd, Taiwan). Then, after aligning the liquid crystal layer 300 with the aligning layer 400, the liquid crystal layer 300 is cured. Wherein, the liquid crystals above the first aligning regions 410 provides a first phase retardation, the liquid crystals above the second aligning regions 420 provides a second phase retardation, and the difference between the first phase retardation and the second phase retardation is $\lambda/2$. A cohesive strength between the aligning layer 400 and the liquid crystal layer 300 is in the range of 3B to 5B tested by cross hatch test.

Figure 2D:
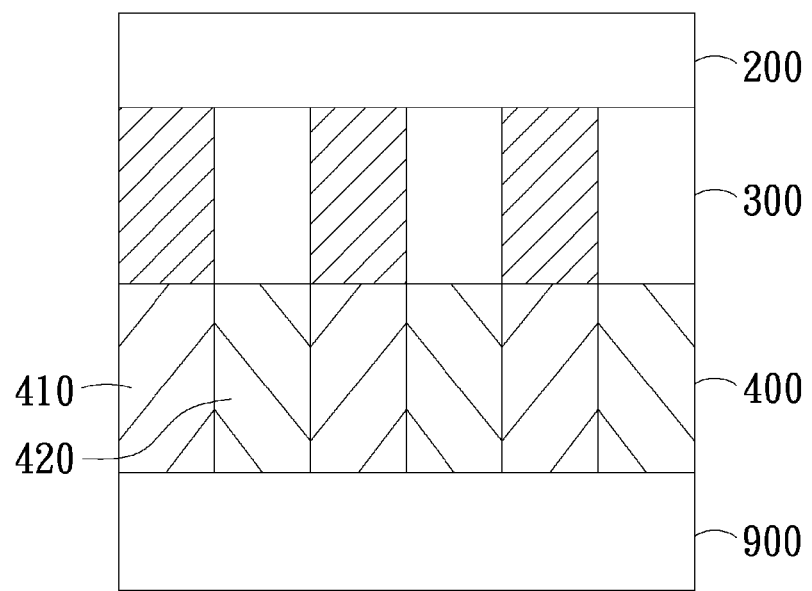

After the liquid crystal layer 300 is cured, an adhesive layer 200 is coated on the liquid crystal layer 300 as shown in FIG. 2D. The material of adhesive layer 200 is selected from a group consisting of acrylic resin, silicone resin and epoxy resin, and the adhesive strength of the adhesive layer 200 is in the range of 50 gf/25 mm to 1500 gf/25 mm, more preferably in the range of 100 gf/25 mm to 300 gf/25 mm. In an embodiment of the method of the present invention, the material of adhesive layer 200 is acrylic resin, and the adhesive strength is about 200 gf/25 mm thereof.

Figure 2E:
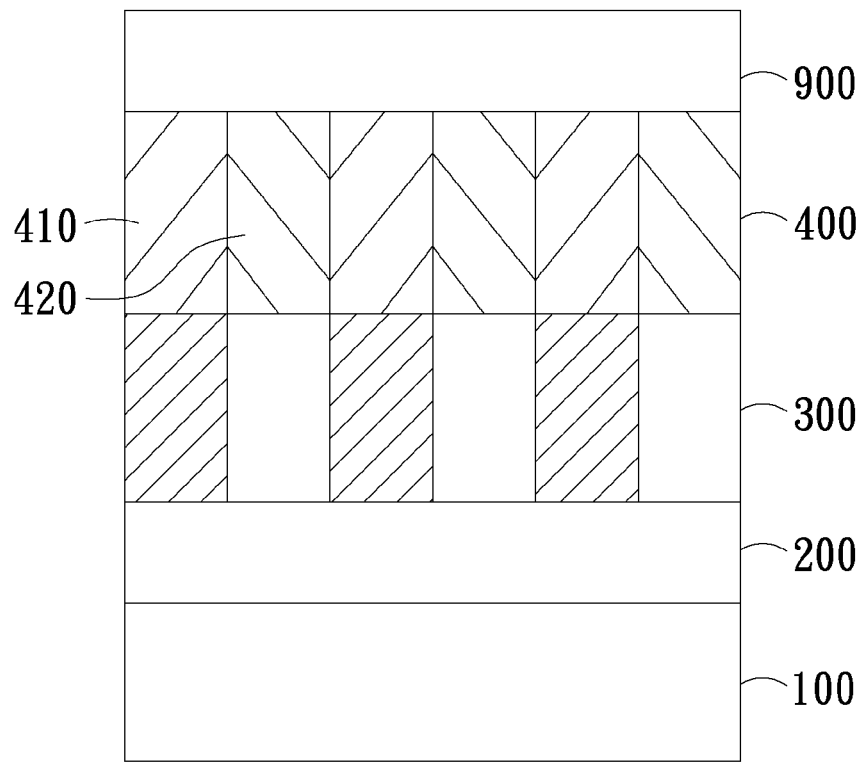

Then, a display panel 100 is adhered on the liquid crystal layer 300 by the adhesive layer 200 as shown in FIG. 2E. In an embodiment of the method of the present invention, first, the liquid crystal layer 300 is adhered on a polarizer, and then a display panel 100 is adhered thereon by the adhesive layer 200, wherein the polarizer is disposed between the adhesive layer 200 and the display panel 100.

Figure 2F:
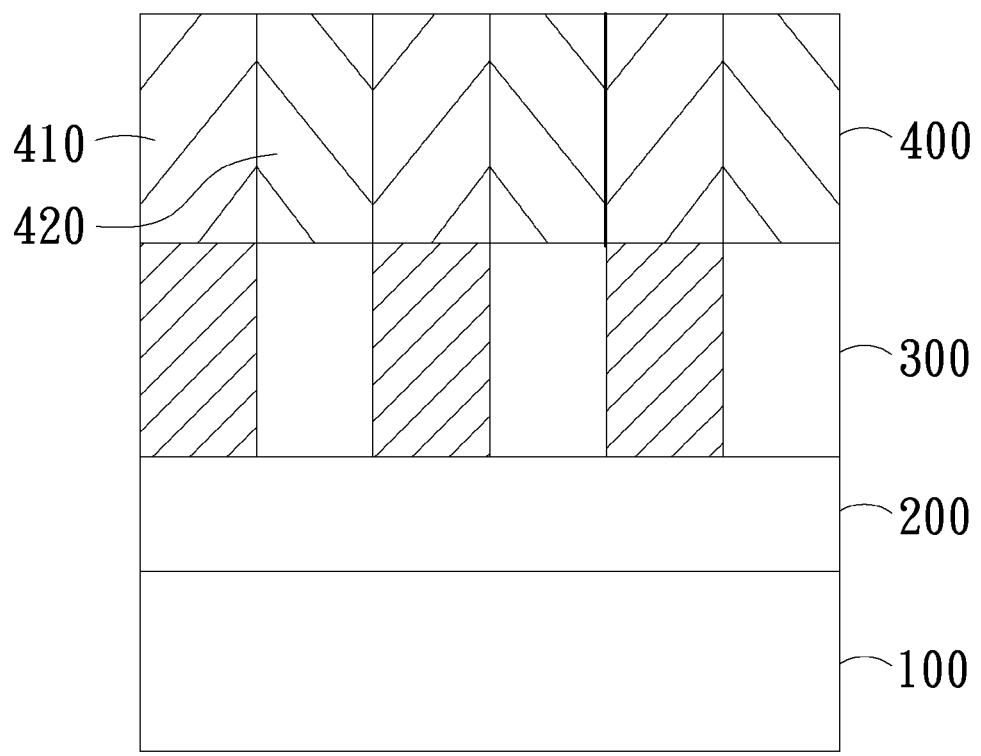

Finally, the substrate 900 is released from the aligning layer 400 as shown in FIG. 2F. In an embodiment of the method of the present invention, after the substrate 900 is released, at least one of functional optical film can be adhered on the aligning layer 400. The functional optical film can be, but not limited to hard-coating film, anti-glaring film, anti-static film, low reflective film, anti-reflective film and a combination thereof.

Accordingly, the three-dimensional display manufactured by the method of the present invention has thinner thickness because the lack of the substrate for supporting liquid crystal. In addition, the manufacturing cost of three-dimensional display can be decreased by using a non-zero phase retardation substrate for supporting liquid crystal layer and aligning layer during manufacturing process.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A three-dimensional display comprising:
    a display panel;
    a liquid crystal layer disposed on a side of the display panel;
    an aligning layer formed from a curable resin disposed on a side of the liquid crystal layer opposite to the display panel and comprising a plurality of first aligning regions and a plurality of second aligning regions, wherein the first aligning regions are interleaved with the second aligning regions and parallel to each other, liquid crystals above the first aligning regions provides a first phase retardation, liquid crystals above the second aligning regions provides a second phase retardation, and a difference between the first phase retardation and the second phase retardation is $\lambda/2$; and
    an adhesive layer disposed between the display panel and the liquid crystal layer, and the display panel and the liquid crystal layer are adhered together by the adhesive layer;
    wherein a pencil hardness of the aligning layer is in a range of 1B to 4H, and an adhesive strength of the adhesive layer is in the range of 50 gf/25 mm to 1500 gf/25 mm.

2. The three-dimensional display according to claim 1, wherein the curable resin is an UV-curable resin or a thermal-curable resin.

3. The three-dimensional display according to claim 1, wherein the curable resin is selected from a group consisting of acrylic resin, silicone resin and epoxy resin.

4. The three-dimensional display according to claim 1, wherein a cohesive strength between the aligning layer and the liquid crystal layer is in a range of 3B to 5B tested by cross hatch test.

5. The three-dimensional display according to claim 1, wherein material of the adhesive layer is selected from a group consisting of acrylic resin, silicone resin and epoxy resin.

6. The three-dimensional display according to claim 1, further comprising a polarizer disposed between the adhesive layer and the display panel.

7. The three-dimensional display according to claim 1, further comprising at least one functional optical film disposed on a side of the aligning layer opposite to the liquid crystal layer thereof, wherein the functional optical film is selected from a group consisting of hard-coating film, anti-glaring film, anti-static film, low reflective film, anti-reflective film and a combination thereof.

8. A method of manufacturing a three-dimensional display, comprising the steps of:
    providing a substrate;
    coating a curable resin on the substrate;
    forming an aligning micro-structures on the curable resin;
    curing the curable resin to form an aligning layer;
    coating a liquid crystal layer on the aligning layer;
    aligning the liquid crystal layer with the aligning layer;
    curing the liquid crystal layer;
    coating an adhesive layer on the liquid crystal layer;
    adhering a display panel on the liquid crystal layer by the adhesive layer; and
    releasing the substrate from the aligning layer;
    wherein, the aligning layer comprising a plurality of first aligning regions and a plurality of second aligning regions, the first aligning regions are interleaved with the second aligning regions and parallel to each other, liquid crystals above the first aligning regions provides a first phase retardation, liquid crystals above the second aligning regions provides a second phase retardation, and a difference between the first phase retardation and the second phase retardation is $\lambda/2$;
    wherein a pencil hardness of the aligning layer is in a range of 1B to 4H, and an adhesive strength of the adhesive layer is in a range of 50 gf/25 mm to 1500 gf/25 mm.

9. The method according to claim 8, wherein material of the substrate is selected from a group consisting of triacetyl cellulose (TAC), poly (ethylene terephthalate) (PET), polycarbonate (PC), poly (methyl methacrylate) (PMMA) and polypropylene (PP).

10. The method according to claim 8, wherein the curable resin is an UV curable resin, and an accumulated energy for curing the curable resin is in a range of 100 mJ/cm$^2$ to 1000 mJ/cm$^2$.

* * * * *